Figure 1:
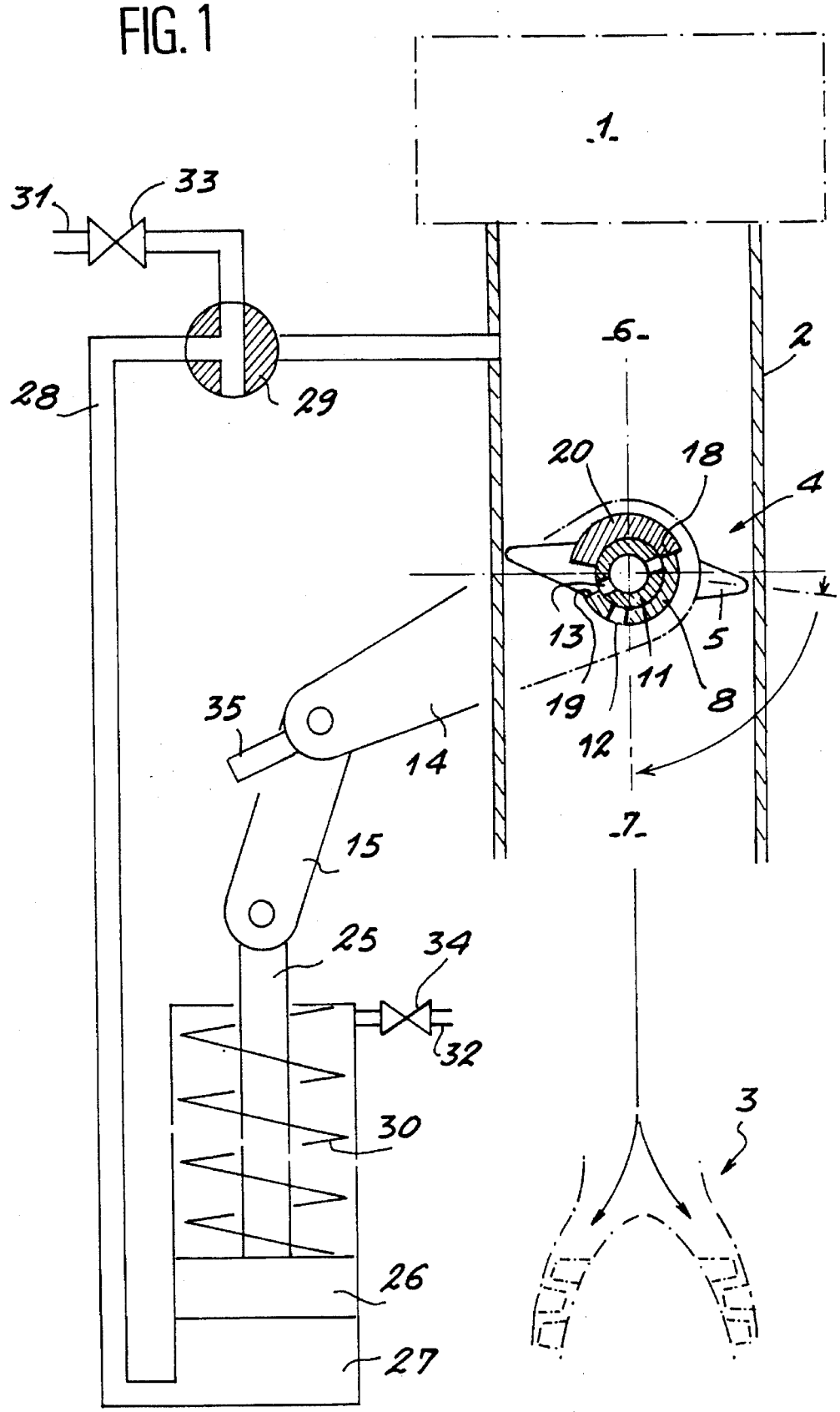

United States Patent [19]
Gallo et al.

[11] Patent Number: 5,499,651
[45] Date of Patent: Mar. 19, 1996

[54] DEICING SYSTEM FOR A BUTTERFLY VALVE

[75] Inventors: Claude Gallo, Le Mee Sur Seine; Guy E. O. LeClercq, Melun, both of France

[73] Assignee: Societe Nationale d'Etude et de Construction de Moteurs d'Aviation "SNECMA", Paris, France

[21] Appl. No.: 291,550

[22] Filed: Aug. 16, 1994

[30] Foreign Application Priority Data

Aug. 18, 1993 [FR] France .................................. 93 10080

[51] Int. Cl.⁶ ..................................................... F02G 5/00
[52] U.S. Cl. ......................... 137/334; 137/339; 60/39.093
[58] Field of Search ........................... 60/39.093; 251/58; 137/338, 339, 334

[56] References Cited

U.S. PATENT DOCUMENTS

| | | | |
|---|---|---|---|
| 2,121,707 | 6/1938 | McGee | 137/334 |
| 2,993,496 | 7/1961 | Ackley | 251/58 |
| 4,561,245 | 12/1985 | Ball | 60/39.093 |
| 4,831,818 | 5/1989 | Norris et al. | 60/39.093 |
| 5,406,798 | 4/1995 | Wiesner, Jr. | 137/339 |

*Primary Examiner*—A. Michael Chambers
*Attorney, Agent, or Firm*—Oblon, Spivak, McClelland, Maier & Neustadt

[57] ABSTRACT

Auto-deicing system with a valve having a butterfly plate (5).

The spindle (8) of the valve (4) is controlled by a system terminated by a pin (11) coaxial to the spindle (8) and which, like the latter, has slots (13). When the pin (8) is iced up, the control system initiates a movement of the pin (11) so that the slots (12, 13) come into extension with one another, which allows a circulation of the hot gas on one side of the butterfly plate (5) through the spindle (8), which is thus reheated. The opening movement resumes when the ice has melted.

The invention is applicable to cold starting systems on aircraft engines.

(FIG. 3)

4 Claims, 3 Drawing Sheets

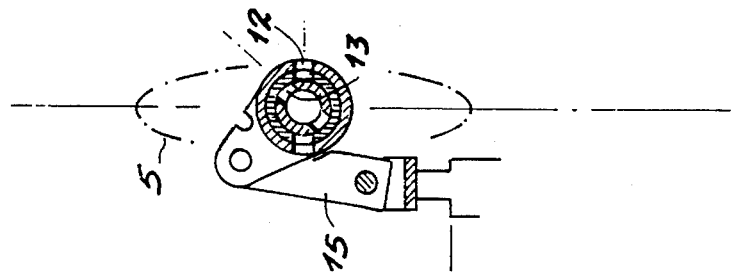
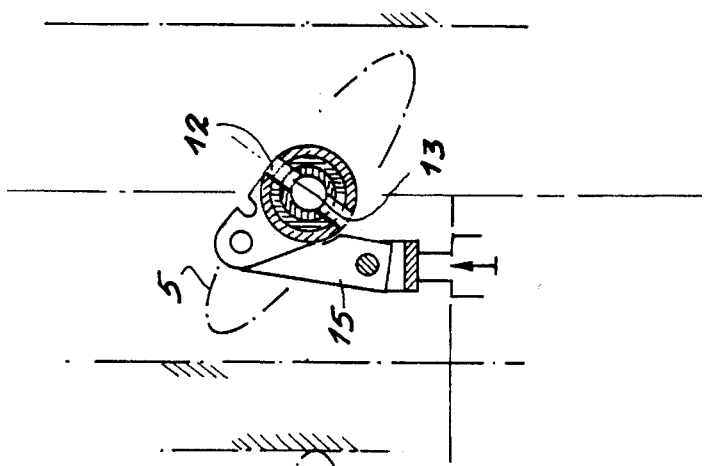
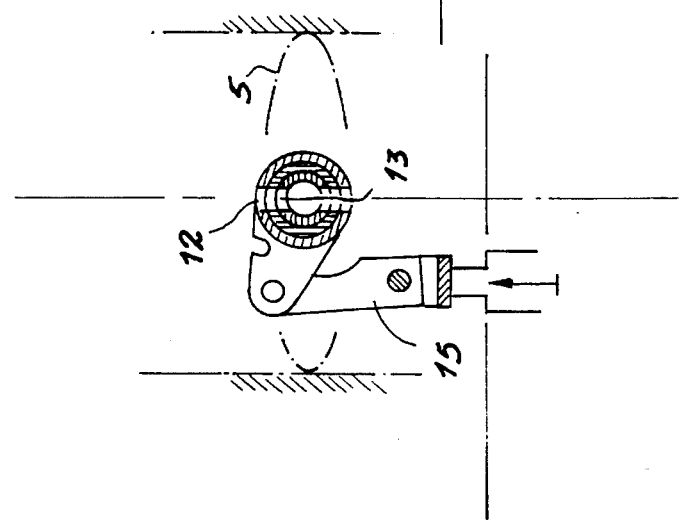
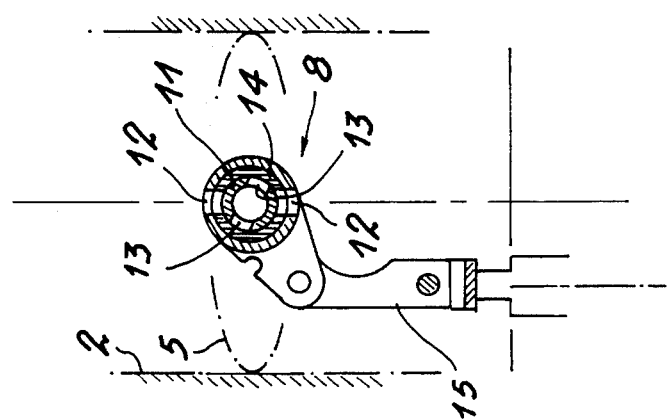
FIG. 3   FIG. 3 A   FIG. 3 B   FIG. 3 C

DEICING SYSTEM FOR A BUTTERFLY VALVE

DESCRIPTION

The invention relates to a deicing system for a butterfly valve.

It is more particularly used on cold starting systems of aircraft engines, whereof an example is described in French patent 2 607 189 and where starting is ensured by the opening of a butterfly valve in the pipe connecting a compressed air source to a turbine, which is then driven. However, it can arrive in cold weather that ice jams the rotation spindle of the butterfly plate and therefore prevents it from opening. The imposing of a force sufficient for breaking the ice can also damage the control mechanism.

The idea of the present invention is to use the drive gas, such as relatively hot compressed air for deicing the valve. Deicing devices involving the circulation of hot gases have already been used on aircraft, but not in this way on such equipment. The system is in fact characterized in that the valve control means is connected to the valve by a pin coaxial to the spindle of the butterfly plate, the pin and the spindle being provided with recesses and rotating about one another between two abutment positions, so that the recesses are superimposed in one of the abutment positions, obtained after initiating the movement of the control means in order to control the opening of the butterfly plate and for linking the portions of the pipe on either side of the butterfly plate and so that the recesses are covered following a movement of the control means in order to control the closing of the butterfly plate.

When the butterfly plate is iced up, it remains stationary and the initiation of the movement of the control means forces the extension of the recesses and a hot gas circulation towards the turbine through the pin and the spindle which are reheated, as well as the remainder of the butterfly plate. When the ice has melted, the movement of the control means resumes and then drives the butterfly plate towards its opening position.

The system is improved by adding an elastic element to the control system, e.g. a torsion spring coaxial to the pin and connected thereto. This element has the function of returning the pin and the spindle to the initial position, i.e. with the recesses covered, as soon as the deicing has stopped whilst preventing the application of an excessive force on the mechanism.

It is possible to use the gas of the source for moving the control system. The latter then comprises e.g. a piston, a lever articulated to the piston and connected by its opposite end to the pin, the piston being mobile in a chamber connected to the gas source by a second pipe provided with an opening and closing means.

The invention is described in greater detail hereinafter relative to the attached drawings, wherein show:

FIG. 1 An overall view of the invention.

Figure 2:
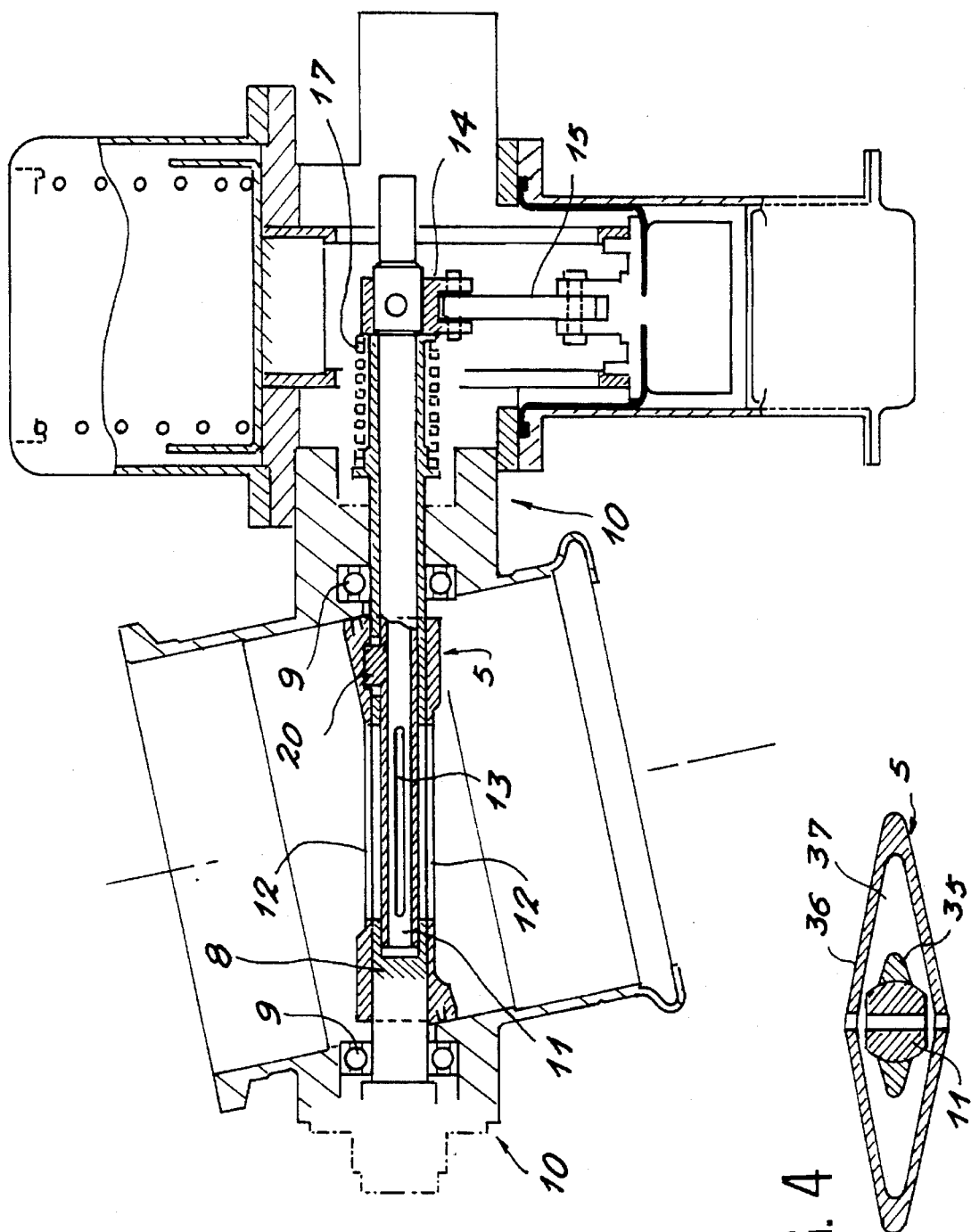

FIG. 2 Another view of the invention.

FIG. 3 A section of FIG. II—II.

FIGS. 3a, Three subsequent states of the system according to 3b & 3c FIG. 3 during deicing.

FIG. 4 A section through the butterfly plate.

A description will firstly be given relative to FIGS. 1, 2 and 3. A hot gas source or which is at least at a positive temperature (above 0° C. or 32° F.) carries the reference 1 and communicates by a pipe 2 with a turbine 3 driven by the gas if ever a valve 4 having a butterfly plate 5 located on the pipe 2 is open, so as to start a gas turbine engine of the aircraft engine to which this system belongs. The butterfly plate 5 of the valve 4 is generally closed and then subdivides the interior of the pipe 2 into an upstream portion 6 and a downstream portion 7 which are not in communication.

The butterfly plate 5 is maintained on a spindle 8 traversing the pipe 2 and pivoting in bearings 9 located in bosses 10 projecting to the outside of the pipe 2. The spindle 8 is hollow to enable a pin 11 coaxial thereto to pivot therein. It has two opposite slots 12 extending over a large part of its length and completely traversing the same, so as to form a recess through the spindle 8 and the pin 11 also has a pair of slots 13 with the same shape. A bush 24 is interposed between the spindle 8 and the pin 11, being integral with the latter and the slots 12 also pass through it.

The spindle 8 and the pin 11 have a considerable extension outside the pipe 2, the pin 11 being terminated there by a crankpin 14 integral therewith and which can be rotated by a small rod 15. The crankpin 14 is provided with a notch 16 and receives the end of a torsion spring 17, whose other end is rigidly connected to the spindle 8. Thus, the spindle 8 can turn about the pin 11 by a movement limited by two positions defined by abutments 18 and 19 of the spindle 8 and which can be touched in turn by a lug 20 of the pin 11, whilst being generally returned by the torsion spring 17 into one of the abutment positions, so that the slots 12 and 13 are not in extension and therefore overlap. The other abutment position corresponds to a superimposing of the slots 12 and 13 enabling the gas filling the upstream portion 6 of the pipe 2 to pass into the downstream portion 7 through slots 12 and 13 even when the butterfly plate 5 closes the pipe 2.

The opening cycle of the butterfly plate 5 will now be described. In the position of FIG. 3, there is a total closure of the pipe 2. The butterfly plate 5 obstructs it and the slots 12 and 13 overlap, the lug 20 bearing on the abutment 18. Opening is brought about by a translation movement of the small rod 15 and the rotation of the crankpin 14. When deicing is necessary, the spindle 8 firstly remains stationary and the pin 11 turns until the lug 20 reaches the abutment 19, as shown in FIG. 3a, where the slots 12 and 13 are in extension and where the gas circulates through the spindle 8 and heats the valve 4 until it is completely deiced. The butterfly plate 5 then starts to move (FIG. 3b) and the movement of the small rod 15 and the crankpin 14 resumes. The final stage is produced in the manner illustrated in FIG. 3. The crankpin 14 and the small rod 15 are stopped, whilst the torsion spring 17 expands again after having been tensioned during stage 3a, which completes the opening of the butterfly plate 5 and again brings about an overlap of the slots 12 and 13, the lug 20 returning against the abutment 18. The closing of the valve 4 can then be controlled.

Reference should again be made to FIG. 1 in connection with the control means. Thus, the small rod 15 can be articulated by its end opposite to the crankpin 14 to a rod 25 of a piston 26, which slides in a chamber 27. Thus, the chamber 27 is subdivided into two parts by the piston 26. A second pipe 28 can link the first with the upstream portion 6 of the pipe 2 by means of a three-way valve 29 and the second part of the chamber 27 is occupied by a coil spring 30, which is compressed there and tends to push the piston 26 into the position corresponding to the closure of the butterfly plate 5.

Venting pipes 31 and 32 lead respectively to the three-way valve 29 and to the second chamber. They can be provided with valves 33, 34 and connected to a suction means rather than to atmospheric pressure.

The first reason for opening the butterfly plate 5 is a movement of the three-way valve 29 for opening the second pipe 28 and making the pressurized gases penetrate the chamber 27 in order to push the piston 26. The venting pipe 32 is then left open so that the air from the second part of the chamber 27 is expelled. For returning the piston 26 to its original position, the three-way valve 29 is oriented so that the venting pipe 31 is linked with the first part of the chamber 27 from which the air is then discharged. A manual control handle 35 is located on the crankpin 14 so that it can be rotated if necessary.

Deicing is faster if the butterfly plate 5 has cavities, as shown in FIG. 4. It then has a core 35 corresponding to the spindle 8 and which partly surrounds the pin and bears thereon, as well as a sheet 36 enveloping the core 35, whilst being separated therefrom by a cavity 37, except on the edges of the butterfly plate 5 close to the bearings 9 where the ore 35 is connected to the sheet 36. The sheet 36 carries slots 12 and the pin 11 carries flats at the issuing points of the slots 13, so that the pin 11 touches the sheet 36 except when the slots 12 and 13 are in extension during deicing, the cavity 37 then being open on the slots 12 and the hot air also enters it.

We claim:

1. System having a valve (4) with a butterfly plate (5) in a cold starting device (1, 2, 3) of an engine incorporating a hot gas source, a turbine (3) driven by the gas, a pipe (2) connecting the source to the turbine and on which is placed the valve (4), as well as a control means for the valve, characterized in that the control means is connected to the valve by a pin (11) coaxial to the spindle (8) of the butterfly plate (5), the pin (11) and the spindle (8) being provided with recesses (12, 13) and mounted so as to rotate about one another between two abutment positions (18, 19) positioned so that the recesses (12, 13) are superimposed in one of the abutment positions, obtained after initiating a movement of the control means so as to control the opening of the butterfly plate and linking the portions (6, 7) of the pipe (2) on either side of the butterfly plate (5) and so that the recesses are covered after a movement of the control means in order to control the closing of the butterfly plate.

2. System having a butterfly valve according to claim 1, characterized in that the control system comprises an elastic element (17).

3. System having a butterfly valve according to claim 2, characterized in that the elastic element (17) is a torsion spring coaxial to and connected to the pin (11).

4. System having a butterfly valve according to claim 1, characterized in that the control means comprises a piston (26), a lever (15) articulated to the piston and connected by its opposite end to the pin (11), the piston being mobile in a chamber (27) connected to the gas source (1) by a second pipe (28) provided with an opening and closing means (29).

* * * * *